US009057782B2

(12) United States Patent
Feigin

(10) Patent No.: US 9,057,782 B2
(45) Date of Patent: Jun. 16, 2015

(54) REALIZATION OF TIME-DOMAIN ULTRA WIDEBAND GROUND-PENETRATING RADAR USING HIGH SPEED ACCUMULATION AND INTERPOLATED SAMPLING

(75) Inventor: Jeffrey R. Feigin, Andover, MA (US)

(73) Assignee: GEOPHYSICAL SURVEY SYSTEMS, INC., Salem, NH (US)

( * ) Notice: Subject to any disclaimer, the term of this patent is extended or adjusted under 35 U.S.C. 154(b) by 125 days.

(21) Appl. No.: 13/588,213

(22) Filed: Aug. 17, 2012

(65) Prior Publication Data

US 2014/0049418 A1    Feb. 20, 2014

(51) Int. Cl.
*G01S 13/88* (2006.01)
*G01S 7/292* (2006.01)
*G01S 13/00* (2006.01)

(52) U.S. Cl.
CPC .............. *G01S 13/885* (2013.01); *G01S 7/2923* (2013.01)

(58) Field of Classification Search
CPC .............. G01V 3/12; G01S 7/02; G01S 7/28; G01S 7/282; G01S 7/285; G01S 13/88; G01S 13/885; G01S 13/89; G01S 7/292; G01S 7/2923
USPC ............... 342/21, 22, 27, 28, 59, 82, 89–103, 342/175, 176, 179, 192–197; 375/316, 340, 375/341
See application file for complete search history.

(56) References Cited

U.S. PATENT DOCUMENTS 3,665,466 A * 5/1972 Hibbard .......................... 342/59
4,180,814 A * 12/1979 Barton .......................... 342/196
4,359,735 A * 11/1982 Lewis et al. .................. 342/194
4,905,008 A * 2/1990 Kawano et al. ................. 342/22
5,835,053 A * 11/1998 Davis ............................. 342/22
5,835,054 A * 11/1998 Warhus et al. .................. 342/22
5,900,833 A * 5/1999 Sunlin et al. .................... 342/22

(Continued)

FOREIGN PATENT DOCUMENTS

WO      WO 0165277 A1    9/2001

OTHER PUBLICATIONS

Chao Chen et al., "Application of Equivalent-time Sampling Combined with Real-time Sampling in UWB Through-wall Imaging Radar", Instrumentation, Measurement, Computer, Communication and Control, 2011, First Internation Conference on, IEEE, Oct. 21, 2011, pp. 721-724, ISBN: 978-0-7695-4519-6.

*Primary Examiner* — Bernarr Gregory
(74) *Attorney, Agent, or Firm* — Michael J. Feigin, Esq.; Feigin & Associates, LLC

(57) ABSTRACT

Embodiments of the disclosed technology use high-speed interpolated (interdigitated) sampling for the specific purpose of GPR (Ground-Penetrating RADAR). This technology solves several issues associated with high-speed sampling in GPR which included 1) dynamic range limitations, 2) regulatory compliance issues, 3) sampler core offset error, and 4) timing errors. High-speed interpolated sampling GPR is implemented using a high-speed ADC in combination with trigger logic (such as an FPGA) and a programmable delay generator. The FPGA or other trigger logic generates a series of randomly dithered trigger pulses. A variable delay generator (or "Vernier") is synchronously controlled in order to produce the fractional timing. The timing of the pulses is randomly or pseudo-randomly dithered, and the phase of the interpolation is shuffled in order to avoid producing discrete spectral lines in the radiated RADAR signal.

16 Claims, 15 Drawing Sheets

(56) References Cited

U.S. PATENT DOCUMENTS

| | | | |
|---|---|---|---|
| 5,912,639 A * | 6/1999 | Beckner | 342/22 |
| 5,920,285 A * | 7/1999 | Benjamin | 342/22 |
| 5,952,954 A * | 9/1999 | Beckner | 342/22 |
| 6,002,357 A * | 12/1999 | Redfern et al. | 342/22 |
| 6,031,482 A * | 2/2000 | Lemaitre et al. | 342/22 |
| 6,091,354 A * | 7/2000 | Beckner et al. | 342/22 |
| 6,130,641 A * | 10/2000 | Kraeutner et al. | 342/179 |
| 6,177,903 B1 * | 1/2001 | Fullerton et al. | 342/28 |
| 6,188,348 B1 * | 2/2001 | Raney | 342/22 |
| 6,496,137 B1 * | 12/2002 | Johansson | 342/22 |
| 6,864,834 B2 * | 3/2005 | Walton | 342/195 |
| 7,167,124 B2 * | 1/2007 | Annan et al. | 342/22 |
| 7,194,236 B2 * | 3/2007 | Lovberg et al. | 342/22 |
| 7,280,068 B2 * | 10/2007 | Lee et al. | 342/22 |
| 7,333,045 B1 * | 2/2008 | Aomori et al. | 342/22 |
| 7,432,846 B2 * | 10/2008 | Martin et al. | 342/22 |
| 7,548,185 B2 * | 6/2009 | Sheen et al. | 342/22 |
| 7,564,931 B2 * | 7/2009 | Venkataramani et al. | 375/341 |
| 7,586,433 B1 * | 9/2009 | Johansson et al. | 342/22 |

* cited by examiner

REALIZATION OF TIME-DOMAIN ULTRA WIDEBAND GROUND-PENETRATING RADAR USING HIGH SPEED ACCUMULATION AND INTERPOLATED SAMPLING

FIELD OF THE DISCLOSED TECHNOLOGY

The disclosed technology relates generally to ground-penetrating radar (GPR), and, more specifically, to a technique for displaying GPR data.

BACKGROUND OF THE DISCLOSED TECHNOLOGY

GPR, or ground-penetrating RADAR (where RADAR is "RAdio Detection and Ranging"), is a technology used to assess the composition and location of heterogeneous materials. GPR uses common radio frequencies and is particularly useful in that it is both non-destructive and non-ionizing. In fact, GPR uses frequencies similar to those of a cellular phone, but at far lower power levels. Common applications include locating the precise position of rebar within a concrete wall/floor, identifying and locating buried objects underground, assessing the quality and uniformity of an asphalt or concrete highway surface, and detecting deterioration on bridge decks. In road surface applications, GPR is used, for example, to detect cracks, fissures, or contamination in any one of the chip seal, pavement layers, gravel base, and so forth. In many roadway applications, a resolution of features of the road surface of less than one inch (2.54 cm) is desired. Such systems may be mounted on vehicles, traveling over the surface while acquiring measurement data. GPR systems are disclosed in more detail in U.S. Pat. No. 5,499,029 to Bashforth, et al., and U.S. Pat. No. 5,384,715 to Lytton, which are hereby incorporated by reference.

FIG. 1 shows a sub-sampled GPR System which acquires one sample of the reflection waveform per transmitted cycle by way of a fast sampler and a variable delay line, as known in the art. The value of the variable delay line 19 advances for each transmitted cycle until the entire time range is captured. Traditional impulse GPR systems use a sub-sampling scheme which achieves high resolution measurements at low cost, such as shown in FIG. 1, but at the expense of being sub-optimally noisy. Each time the transmitter 12 sends a pulse (such as incident transmission 10), the receiver 14 detects the response 15 (the reflected waveform of a measurement object 11) only at a very precise instant of time which is advanced in position with each successive transmission. Such a technique is possible because the RADAR analog waveform can be reproduced as many times as necessary, such that it is not necessary to capture all of the information at once. This technique is generally referred to as equivalent time sampling (ETS). Hundreds or even thousands of pulses are transmitted in order obtain a full measurement set over the desired time range. A further refinement of this technique is to direct more sampling effort to portions of the waveform where additional SNR enhancement is desired. However, most of the received energy is discarded (the energy present at times other than the discrete sampling point) and the resultant measurement is inefficient, in terms of noise, relative to the amount of energy that was transmitted (see FIG. 2).

FIG. 2 shows an example of a timing diagram used in the prior art to carry out GPR measurements. The figure shows how one point (21, 22, 23, 24, 25, and 26, where 26 shows multiple points) is acquired from each reflected RADAR waveform (that is, Responses 1 through 5 and Response N, as hundreds or thousands of data points may actually be used) and compiled to form one single time range measurement. A noise-free, optimal result is shown as noise-free graph 28. Observe that the compiled result (the subsampled response 29) has high frequency noise, while the constituent individual RADAR responses contain slowly varying noise.

Recovery of all or most of the reflected RADAR information greatly improves the measurement signal energy with respect to noise; more efficient signal detection directly translates to improved system performance. This improved detection technique is referred to as High Speed Interpolated Sampling. Until recently, real-time sampling techniques for most GPR applications have been prohibitively expensive and required unreasonable levels of power consumption because of the difficulty in sampling and quantizing an analog waveform at such high speeds. However, advances in integrated circuit technology have enabled the development of nearly-suitable low-cost monolithic devices that perform at reasonably high speeds while consuming relatively small amounts of power.

Therefore, based on a need in the art to find a better way to resolve weak targets when employing ground-penetrating radar at high speeds, the present technology improves upon GPR measurement techniques as follows.

SUMMARY OF THE DISCLOSED TECHNOLOGY

Therefore, it is an object of the disclosed technology to provide lower cost tools which require lower processing power to achieve optimal or near-optimal results of GPR measurements.

A GPR transmitter/receiving is configured, in an embodiment of the disclosed technology, to measure a waveform by way of radar. Such a transceiver carries out steps of obtaining a plurality of time-offset linearly sampled sequences, then constructing a composite measurement waveform based on the plurality of interdigitated linearly sampled sequences. The time offset of each subsequence is an amount that is smaller than the sampling period of one of such sequences. A composite measurement sequence is constructed, in embodiments, from interdigitation of a plurality of combined individual sequences. Each linearly sampled sequence is acquired at a lower rate than is represented by the composite measurement sequence.

The above may be accomplished by way of transmitting a plurality of pulses into the ground at a single location, each transmitted pulse of the plurality of pulses having a unique fractional delay corresponding to a position of phase of the interdigitated (or interpolated) sequences. For purposes of this disclosure, "interdigitated" is defined as a plurality of sampled sequences, obtained linearly, which are spaced apart from one another in time, are combined with at least one additional plurality of sequences, obtained linearly, and fill in at least some spaces between previously obtained sampled sequences. The interdigitation phase, or sampling order of each sequence in the plurality of interdigitated linearly sampled sequences, may be randomized or pseudo-randomized such that the transmitted pulses are aperiodic. A pseudo-random pattern is one which appears to be random, but is actually deterministic in that a pattern emerges from the random numbers generated. When, for example, using a 1:13 ratio (13 passes) for interdigitation, a sampling order may be repeated after several million iterations, resulting in a pseudo-random order (as opposed to a "random order" which is defined as never repeating The sequence is sampled to produce the analog measurement waveform where each super-Nyquist data point is sampled exactly once (that is, one and only one time) in the plurality of combined individual interdigitated sequences. In another embodiment, the measurement waveform is constructed from a plurality of iterations of constructing the interdigitated waveform from constituent sequences which form the interdigitated waveform to produce a composite waveform that represents the super-Nyquist sampled waveform. The constructing of the waveform may also include accumulation (defined as sumation of the multiple copies of the waveform) or averaging of the multiple iterations of the composite interdigitated waveform.

A discrete time filter FIR (finite impulse response) or IIR (infinite impulse response) may be applied to the measurement waveform after construction thereof.

DETAILED DESCRIPTION OF EMBODIMENTS OF THE DISCLOSED TECHNOLOGY

Embodiments of the disclosed technology use high-speed interpolated (interdigitated) sampling for the specific purpose of GPR (Ground-Penetrating RADAR). This technology solves several issues associated with high-speed sampling in GPR which include 1) dynamic range limitations, 2) regulatory compliance issues, 3) ADC sampler core offset error, and 4) timing errors. High-speed interpolated sampling GPR is implemented using a high-speed ADC in combination with trigger logic (such as an FPGA) and a programmable delay generator. The FPGA or other trigger logic generates a series of randomly dithered trigger pulses. A variable delay generator (or "Vernier") is synchronously controlled in order to produce the fractional timing. The timing of the pulses is randomly or pseudo-randomly dithered (defined as, "an intentionally applied form of noise used to randomize quantization error"), and the phase of the interpolation is shuffled in order to avoid producing discrete spectral lines in the radiated RADAR signal.

Embodiments of the disclosed technology will become clearer, in view of the foregoing description of the figures.

Figure 1:
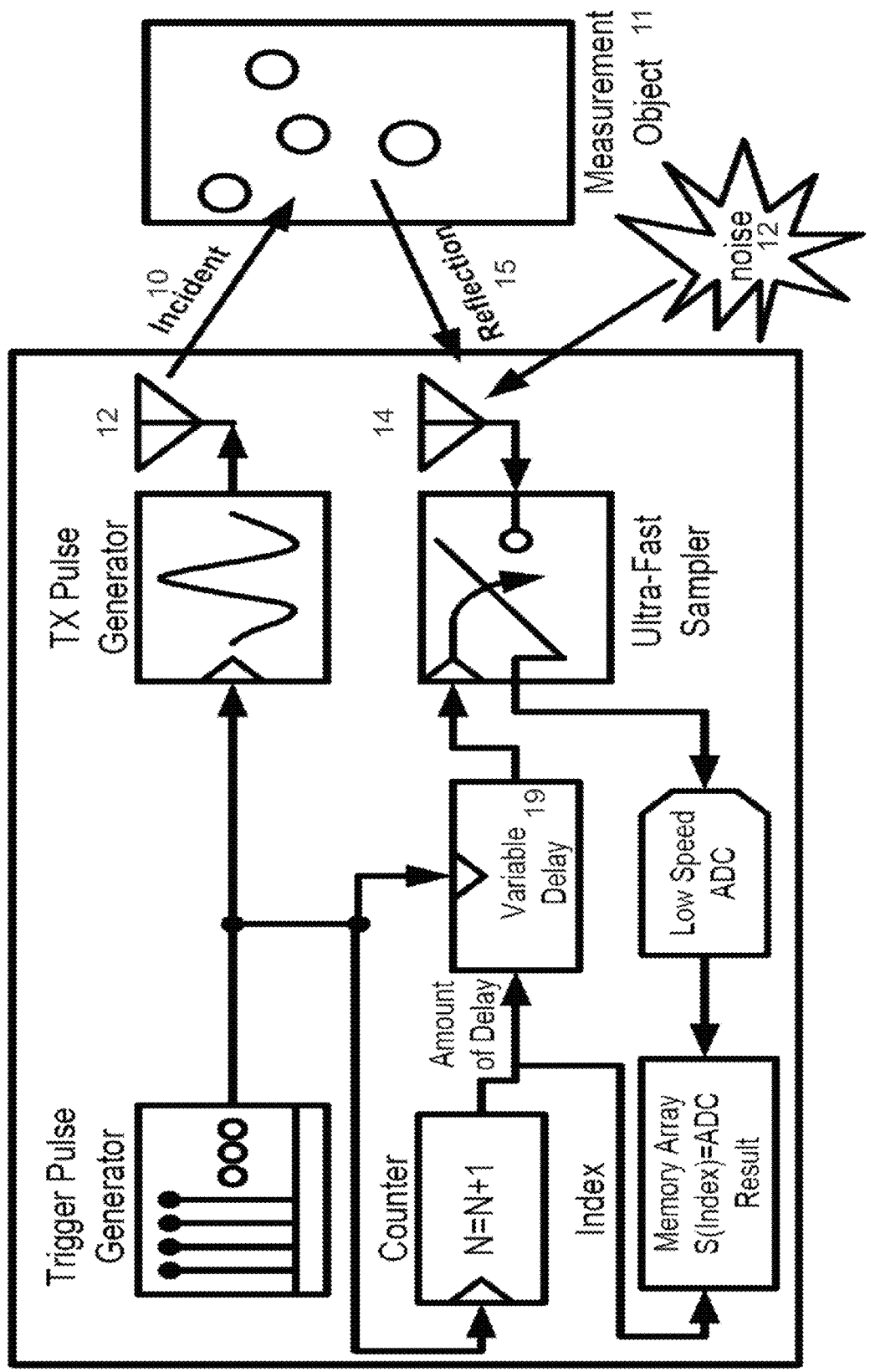
FIG. 1 shows a sub-sampled GPR System which acquires one sample of the reflection waveform per transmitted cycle by way of a fast sampler and a variable delay line, as known in the art.
Figure 2:
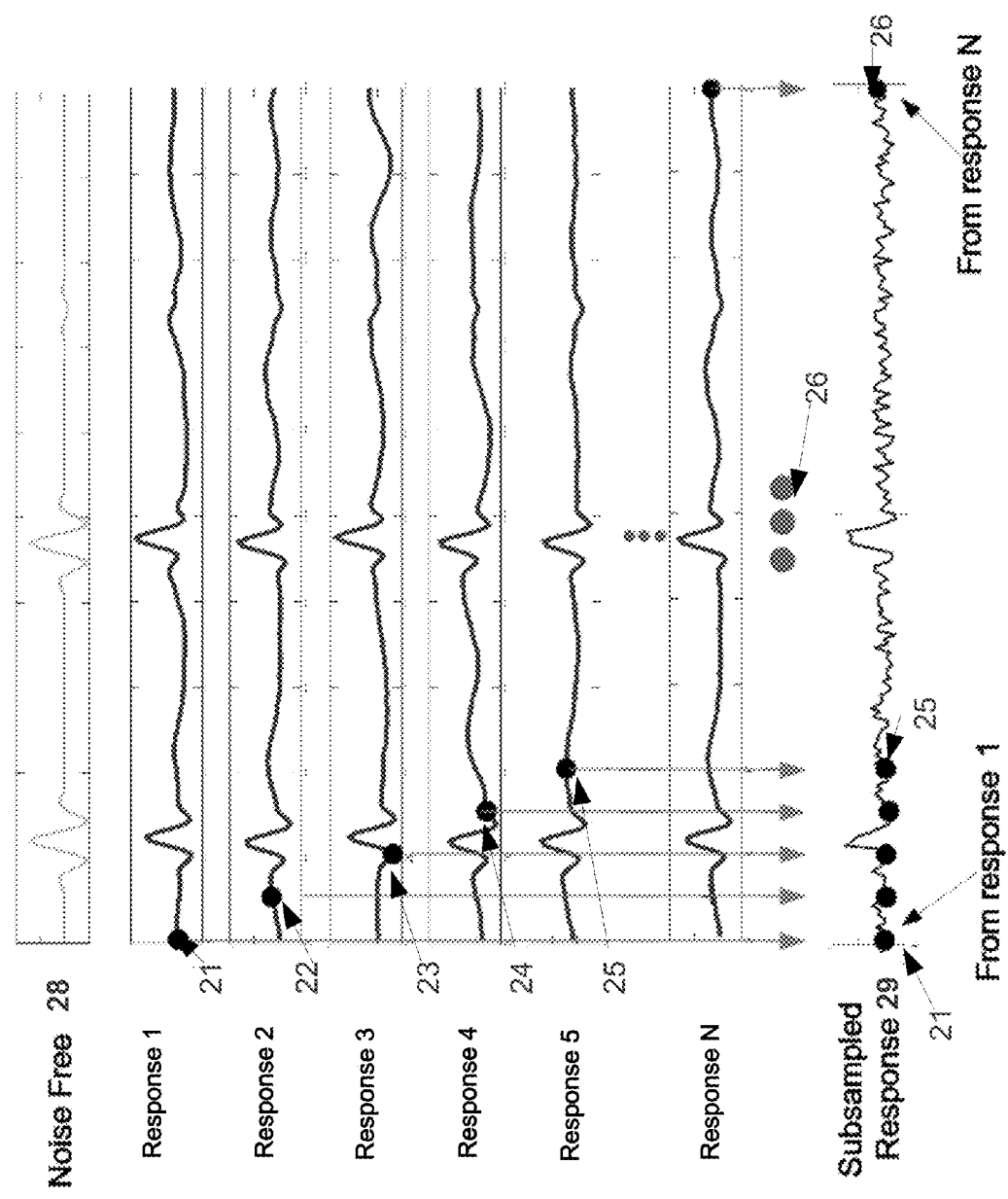
FIG. 2 shows an example of a timing diagram used in the prior art to carry out GPR measurements.
Figure 3:
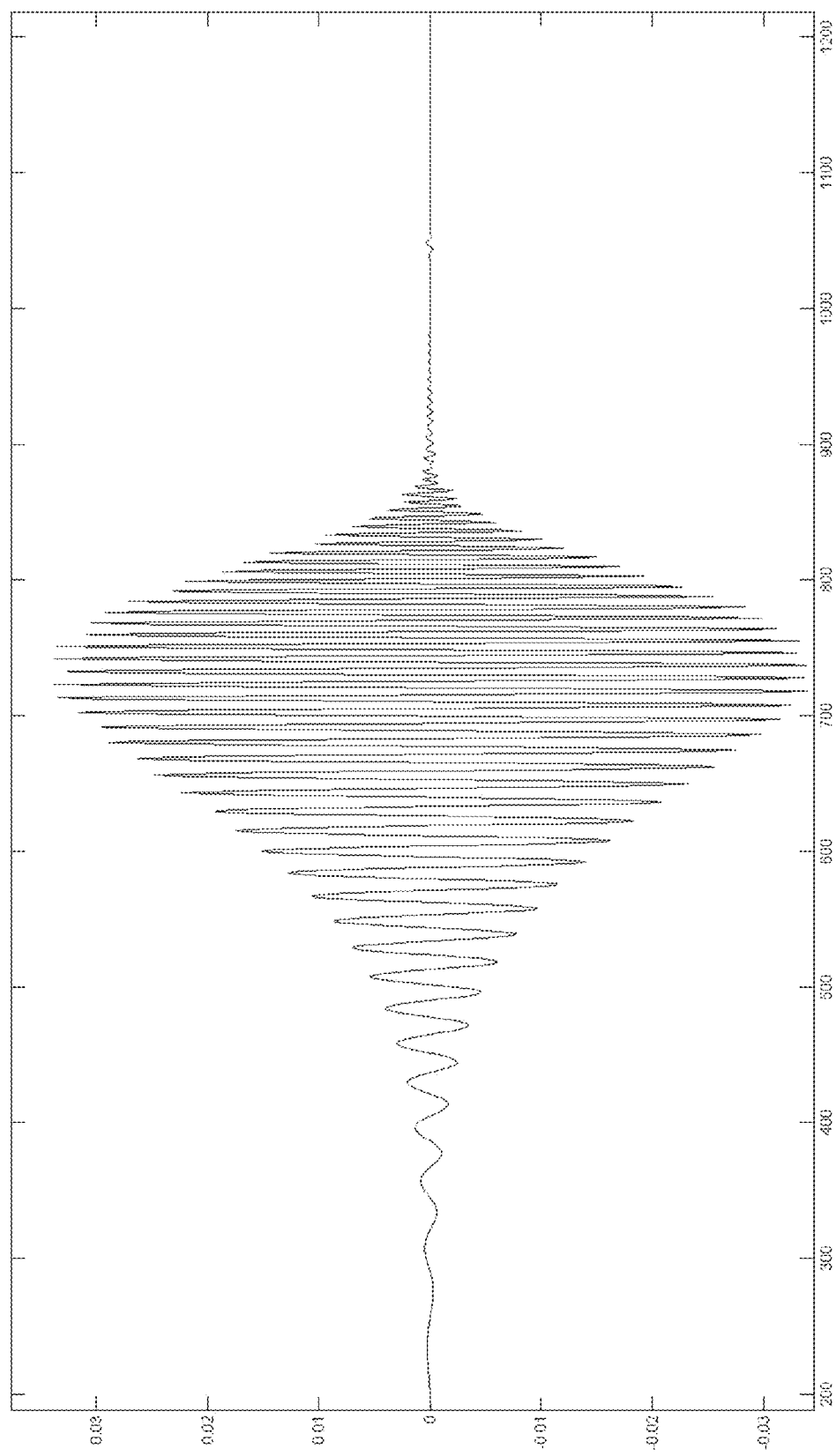
FIG. 3 shows a chirp waveform which is designed to produce RADAR data, as one of many possible transmit pulse shapes used to carry out embodiments of the disclosed technology.

FIG. 3 shows a chirp waveform which is designed to produce RADAR data, used as one possible waveform to carry out embodiments of the disclosed technology. The X-axis refers to a sample number, while the Y-axis is a measure of amplitude, which, for example, may be a measure of volts. A "chirp waveform" is defined as one in which the frequency increases or decreases with time and may alternatively be referred to as a "sweep signal." In FIG. 3, the chirp waveform produced is identical to that of an impulse, but has a reduced peak to average ratio in which more amplification is applied, in embodiments of the disclosed technology, applied at the receiver, which results in more effective use of the available number of bits. This particular example adds 1.0 bit (6.02 dB) to the dynamic range.

The minimum required sampling rate for maximum efficiency corresponds to a rate that is at least twice the frequency of the coherence bandwidth of the RADAR response. This means that at (and only at) the highest frequencies that conventional GPR operates, a sampling rate of approximately 4 GS/S is required in order to fully recover the available energy. The measurement of "GS/S" is gigasamples per second. While such a sampling rate is achievable with single-chip off the shelf technology, three concerns arise: 1) it is difficult to achieve the necessary resolution (number of effective bits) at these sampling rates, 2) the cost is high, and 3) current consumption increases disproportionately with the respect to the benefit.

The first issue, dynamic range, is enhanced, in embodiments of the disclosed technology by increasing the pulse repetition frequency (PRF), while proportionately decreasing the transmitted energy per pulse. This scheme, in conjunction with fine-granularity transmit time dithering, would produce the same emissions according to the FCC (Federal Communication Commission) criteria which governs radio transmission in the United States), but divides the transmitted energy across multiple cycles. A typical receive time range is about 10 nS, while the transmit time interval is about 10 microseconds (a factor of about 1000). As such, there exists the opportunity to divide the transmitted pulse into 1000 smaller pulses. If a high speed sampler were employed to continuously sample the waveform 1000 times, this would result in a dymanic range enhancement of 30 dB. Therefore, the use of low-noise amplifiers to overcome sampler noise becomes far more practical as the waveform amplitude is 30 dB smaller. A further enhancement is achieved, in embodiments of the disclosed technology, by using a chirp waveform due to the reduced dynamic range requirements, referring again to FIG. 3. This particular pattern is 10 ns long and provides a 1 bit enhancement (6.02 dB) over an impulse, but far more improvement is possible with a longer sequence. For a 100 KHz PRF, it is reasonable to have a 10 uS sequence which yields several more bits of dynamic range enhancement.

While the cost and current consumption issues for the very fastest single-chip devices on the market are difficult to avoid, it is also possible to operate in an interpolated mode where the complete RADAR response is still sub-sampled, but at a much higher rate than one sample per transmitted pulse (assuming full power pulses). This approach retains most of the advantages of linear sampling, but greatly relaxes the requirements for the ADC.

Figure 4:
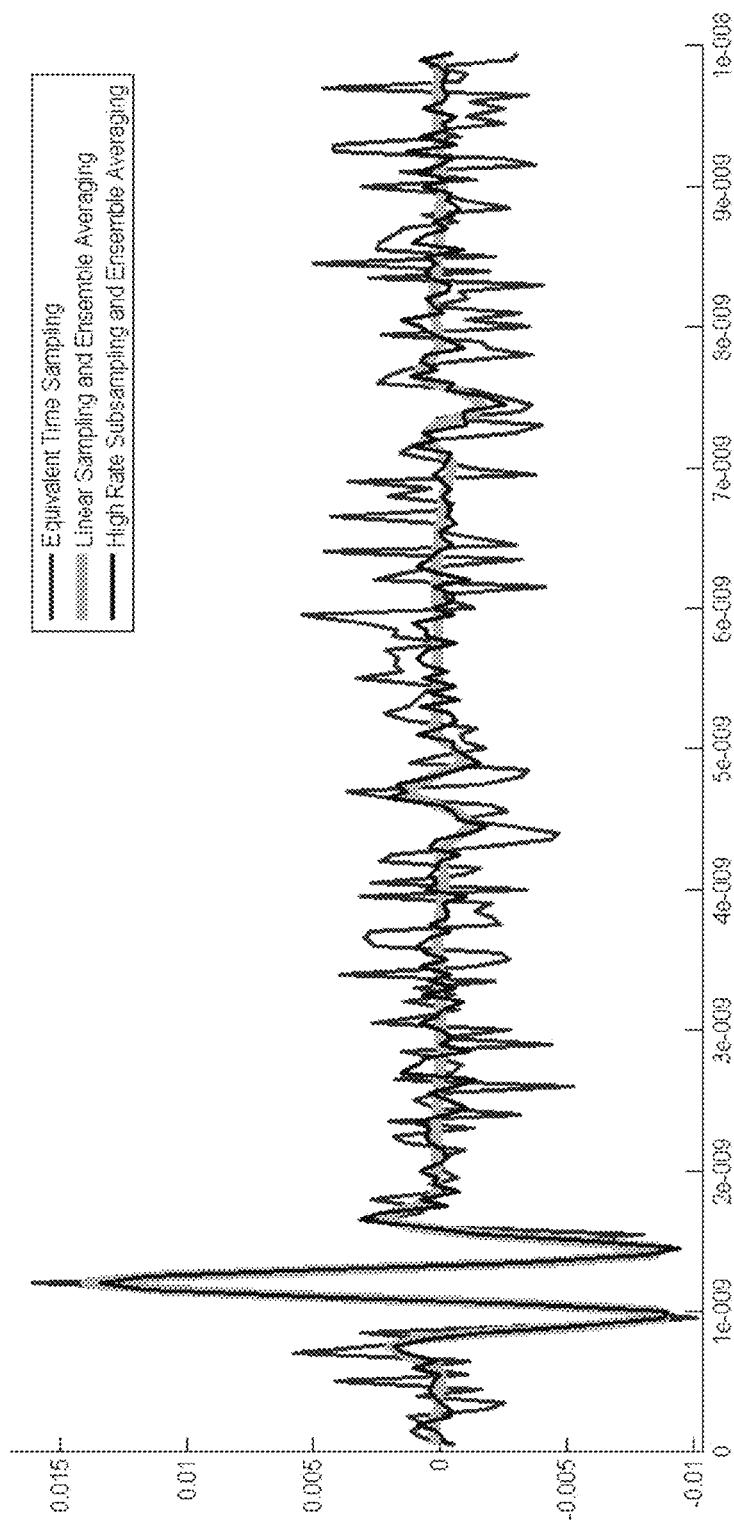
FIG. 4 shows simulated GPR response plotted for three unique sampling patterns, to carry out embodiments of the disclosed technology.

FIG. 4 shows simulated GPR response plotted for three unique sampling patterns, to carry out embodiments of the disclosed technology. In this graph, the number of transmitted cycles is identical and the sampling Interval is 50 ps (picoseconds) over a 10 ns time range. The simulated sampling patterns are equivalent time sampling (one sample per transmit cycle), linear sampling and averaging (all of the samples from all of the transmit cycles are averaged together). This is carried out utilizing high rate sub-sampling (1:13 decimation). Based on this graph, which shows time in seconds on the x-axis, and amplitude (for example, volts) in the y-axis, one can see that linear sampling produces the least amount of noise. Correspondingly, equivalent time sampling produces the greatest amount of noise. The technique used in embodiments of the disclosed technology, which is high rate subsampling and ensemble averaging, is a combination of linear sampling and equivalent time sampling. In equivalent time sampling, one measurement is taken for each transmission, whereas with a high rate, it is sampled at a high rate of speed. In the claimed technology, the waveform is constructed from several interdigitated, linearly sampled sequences whose represented rate is the same as that of the single high rate sequence. An advantage to this method of sampling is ease of implementation and reduced power consumption requirements, along with reduced processing requirements per unit of time.

Figure 5:
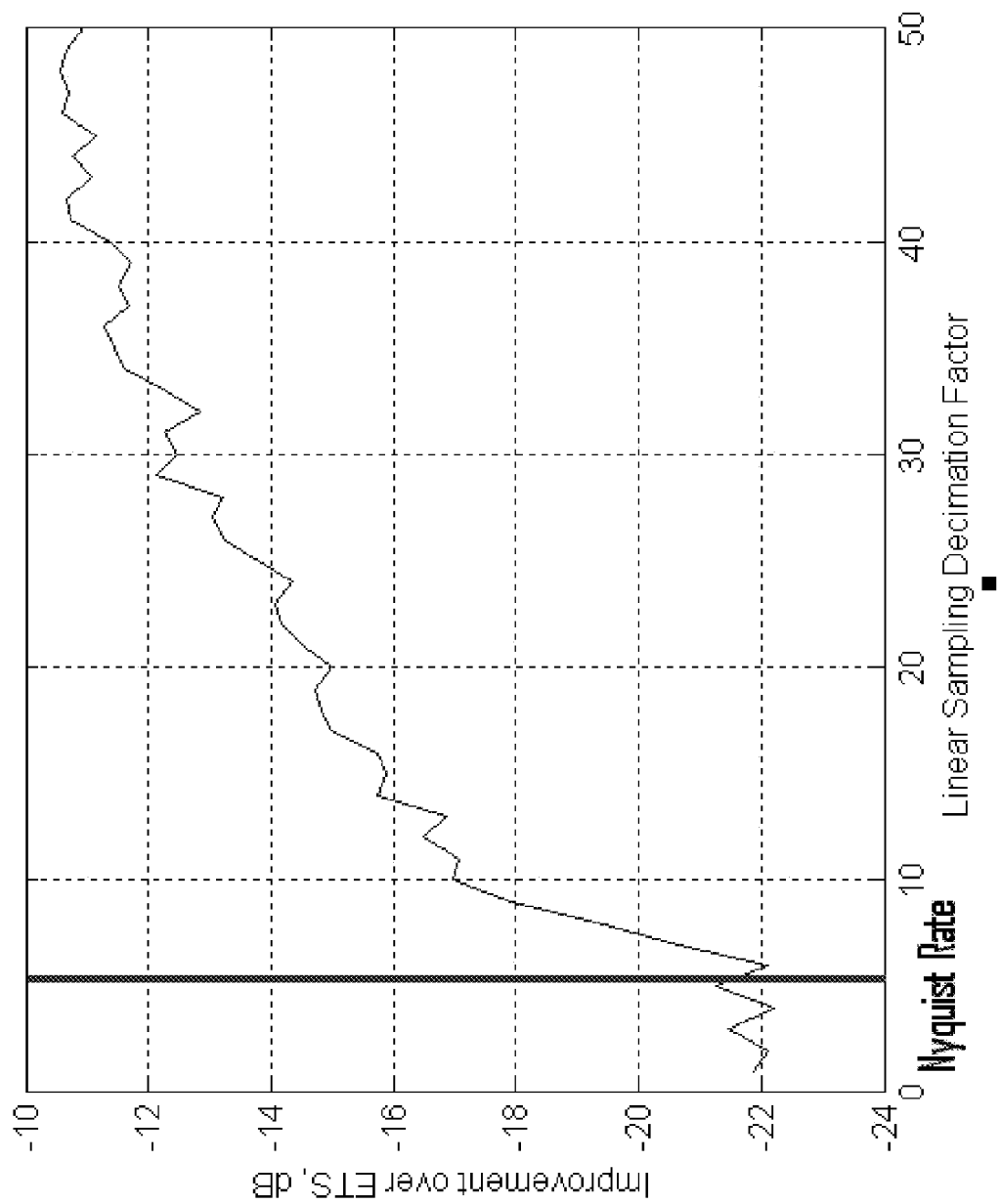
FIG. 5 shows simulation results (10 trials per point) for an amount of improvement for a range of decimation factors, as used in embodiments of the disclosed technology where a the Linear Sampling Decimation Factor greater than 1, but less than the total number of sampling points is the region of this plot in which this technology is applied.

FIG. 5 shows simulation results (10 trials per point) for an amount of improvement for a range of decimation factors, as used in embodiments of the disclosed technology where a Linear Sampling Decimation Factor greater than 1, but less than the total number of sampling points is the region of this plot in which this technology is applied. The improvement shown is improvement over an equivalent time sample (ETS) for the range of decimation factors. Observe that no noise improvement is shown when increasing the sampling rate beyond the Nyquist Rate. This simulation was configured such that the decimation factor for linear sampling is varied over a range from 1 (no decimation) to 50. The linear sampling interval is set to 50 pS (picoseconds), which is the equal to 20 Gs/s (giga-samples per second), and the Nyquist Rate of the RADAR reflection and noise is approximately 5 Gs/s. A decimation factor of 50 corresponds to a sampling rate of 400 Ms/s (mega-samples per second).

FIG. 5 shows the resultant improvement over an equivalent time sample obtained by increasing the sampling rate, in embodiments of the disclosed technology. It is also clear that there is little advantage, in terms of mean square error (MSE), of increasing the sampling rate beyond the Nyquist rate for this particular case. Finally, the relationship between the number of physical bits (with no bit interpolation and not considering ENOB (effective number of bits)) and MSE is considered. In this particular simulation, the maximum level corresponds to +/−1 and the RMS noise 2 mV.

Figure 6:
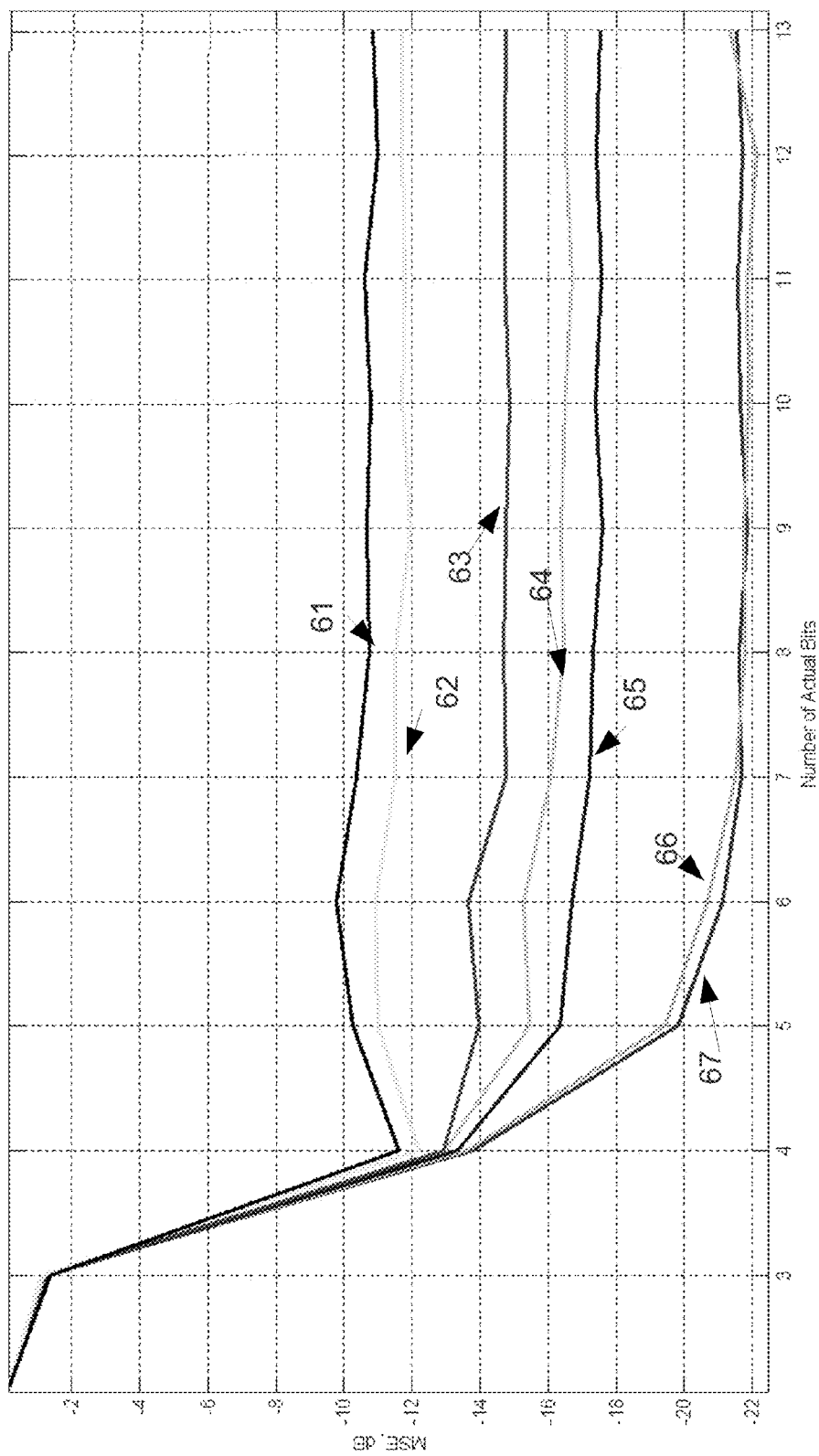
FIG. 6 shows mean square error results for various sampling rates when the number of bits is varied.

FIG. 6 shows mean square error results for various sampling rates when the number of bits is varied. Line 61 is a 1:1 ratio at 20 Gs/s (20 giga-samples per second), line 62 is a 1:4 ratio at 5 Gs/s, line 63 is a 1:10 ratio at 2 Gs/s, line 64 is a 1:13 ratio at 1.5 Gs/s, line 65 is a 1:20 ratio at 1 Gs/s, line 66 is a 1:35 ratio at 570 Ms/s (mega-samples per second), and line 67 is a 1:50 ratio at 400 Ms/s. The ratios represent an interdigitation factor. For example, the 1:13 ratio of line 64 requires 13 transmit pulses in a cycle in order to construct a resulting waveform. It is clear that, under these circumstances, no more than 8 bits of resolution is helpful.

Figure 7:
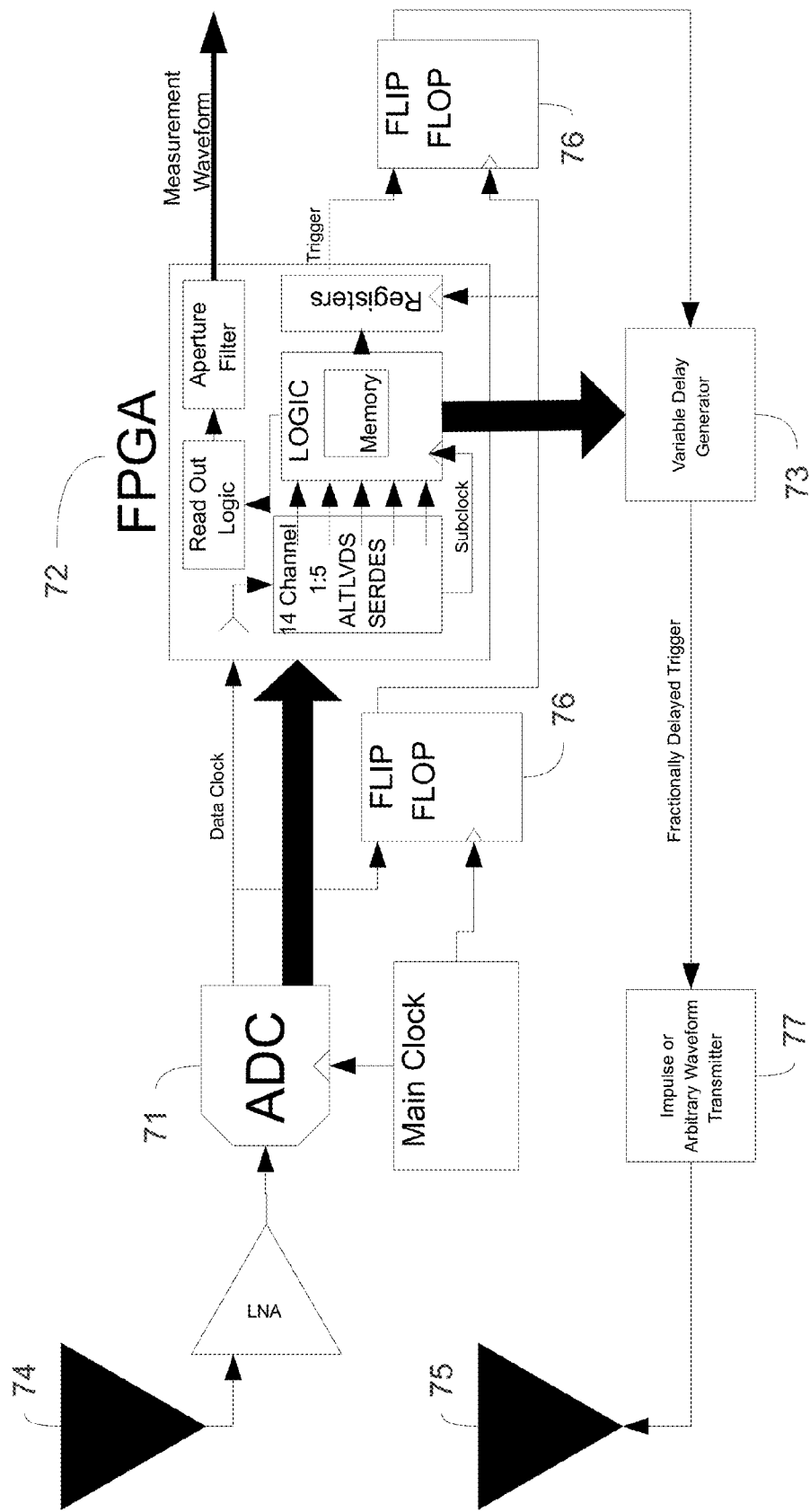
FIG. 7 shows a hardware diagram of a high-speed interpolated and accumulated RADAR system used to carry out embodiments of the disclosed technology.

FIG. 7 shows a hardware diagram of a high-speed interpolated and accumulated RADAR system used to carry out embodiments of the disclosed technology. The high-speed interpolated sampling GPR is implemented using a receiver 74 and high-speed ADC (analog to digital converter) 71 in combination with trigger logic (such as an FPGA 72), and a programmable delay generator 73 as shown in FIG. 7. The FPGA (field programmable gate array) 72 or other trigger logic generates a series of randomly dithered trigger pulses. Flip flop 76 is a device whose output is triggered based on a clock edge (a pulse received at regular time intervals). This removes uncertainty from the FPGA. A Variable Delay Generator (or "Vernier") 73 is synchronously controlled in order to produce the fractional timing. The timing of the pulses is both randomly dithered and the phase of the interpolation is shuffled in order to avoid producing discrete spectral lines in the radiated RADAR signal; Shuffling is a mechanism that produces fine-granularity transmit time dithering. The main clock and data clock are used in timing. After passing through an impulse or arbitrary waveform transmitter 77.

The ADC 71 produces a continuous stream of RADAR samples whose values are spaced at some time interval that may be either above or below the Nyquist rate. It is, however, a key that the ADC utilizes in an internal sampler whose track-and-hold bandwidth is greater than the Nyquist rate for the given RADAR measurement scenario. This stream of samples is then sorted into appropriate memory locations within the FPGA (or other device that contains memory storage elements). One or more transmit pulses is then sent, such that a RADAR waveform is assembled. Useful interpolation rates range from no interpolation (a complete waveform is assembled from just on transmitted pulse) to a factor of 32. An aperture filter 75 is then applied to the reconstructed waveform.

The RADAR waveform is completely captured at an exceptionally high rate that is well beyond what is required for a typical GPR application; the RADAR reflection waveform has a very high coherence time (i.e., it changes very slowly) with respect to the rate at which this measurement is being collected. Therefore, this measurement is repeated tens, hundreds, or even thousands of times and averaged or accumulated in order to reduce the influence of noise. This averaging or accumulation operation occurs in a similar amount of time as a conventional ETS system, yet with far better noise performance.

The interpolation ratio determines the number of transmit cycles required to produce one cycle of a measurement waveform. Despite the fact that a higher interpolation ratio means that fewer results are averaged together in a given period of time, a higher sampling density results, whose proper aperture filtering results in an identical SNR (Signal to Noise Ratio). It is very desirable to operate the system at larger interpolation ratios, even when the native sampling rate of the ADC is already above the Nyquist rate, and to rely upon the aperture filter to provide noise-averaging, as this also removes other system artifacts, such as minor timing errors.

Another feature of the disclosed technology is that samples from the ADC are accumulated in a pattern that minimizes sample gain, phase, and DC errors found in common ADC devices. This issue arises from the fact that many ADC are composed of paralleled sub-cores (even monolithic devices) whose individual cores are imperfectly matched. While many of these devices are acceptable for other applications (such as wideband data communications), core interleave error is problematic for GPR systems, due to the high dynamic range that results from accumulation and/or averaging. This issue is solved by controlling the variable delay generator and memory accumulation locations in such a way that each sample of the measurement waveform is comprised of an equal number of representatives from each of the ADC's sub-cores.

Figure 8:
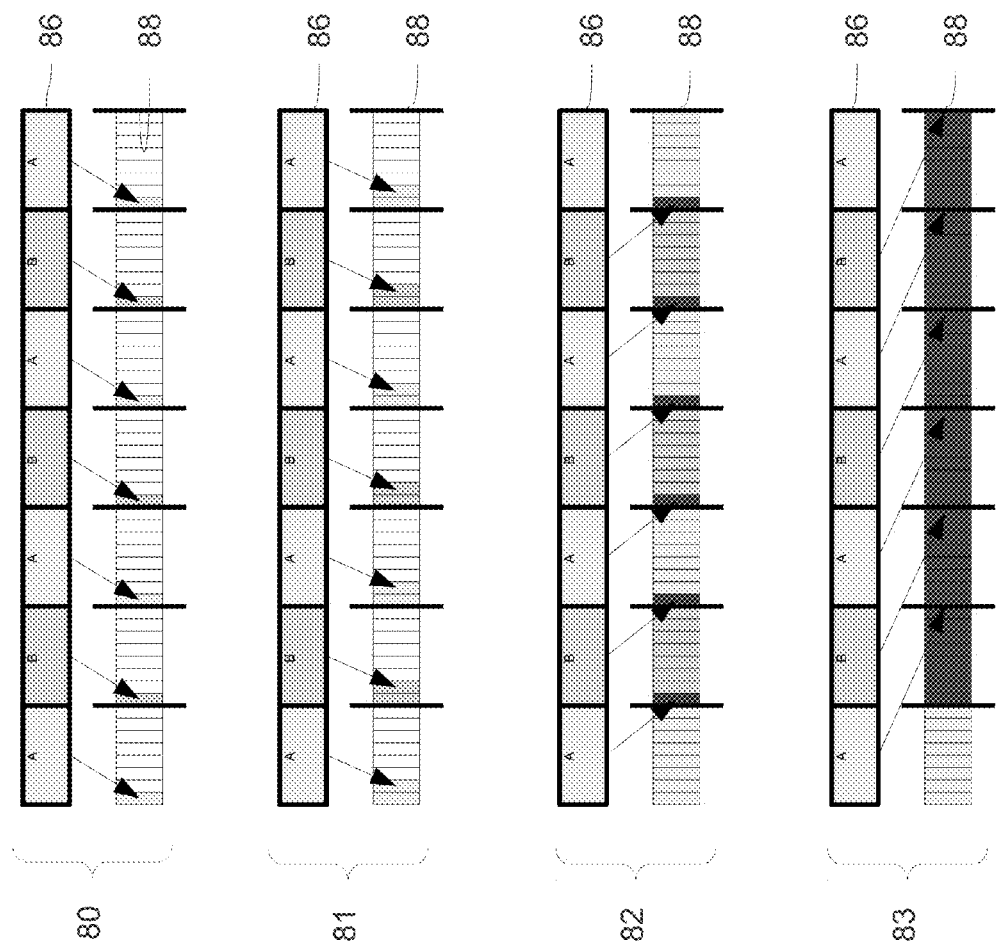
FIG. 8 depicts an example sampling pattern where the interleave ratio is eight and the constituent ADC contains two cores, in an embodiment of the disclosed technology which includes ADC core-interleave error cancellation.

FIG. 8 depicts an example sampling pattern where the interleave ratio is eight and the constituent ADC contains two cores, in an embodiment of the disclosed technology. Sixteen Vernier phases are used to accumulate the waveform into an effective sampling rate that is eight times the native ADC sampling rate, but each sample contains a uniform number of contributions of both ADC sub-cores. Vernier phase 0 is represented in section 80 of the figure, Vernier phase 1 is represented in section 81 of the figure, Vernier phase 8 is represented in section 82 of the figure, and Vernier phase 15 is represented in section 83 of the figure. At each phase, data outputted from an ADC core 86 is populated into a memory location 88 to provide a complete waveform for each of, in this example, eight time delays. Thus, in section 80 corresponding to Vernier phase 0, the first bit of 8 bits is populated. In section 81, corresponding to Vernier phase 1, the second bit is populated, and so forth, though, as explained above, the bit which is populated next is changed in each iteration to reduce error caused by the measuring equipment.

Figures 9A, 9B:
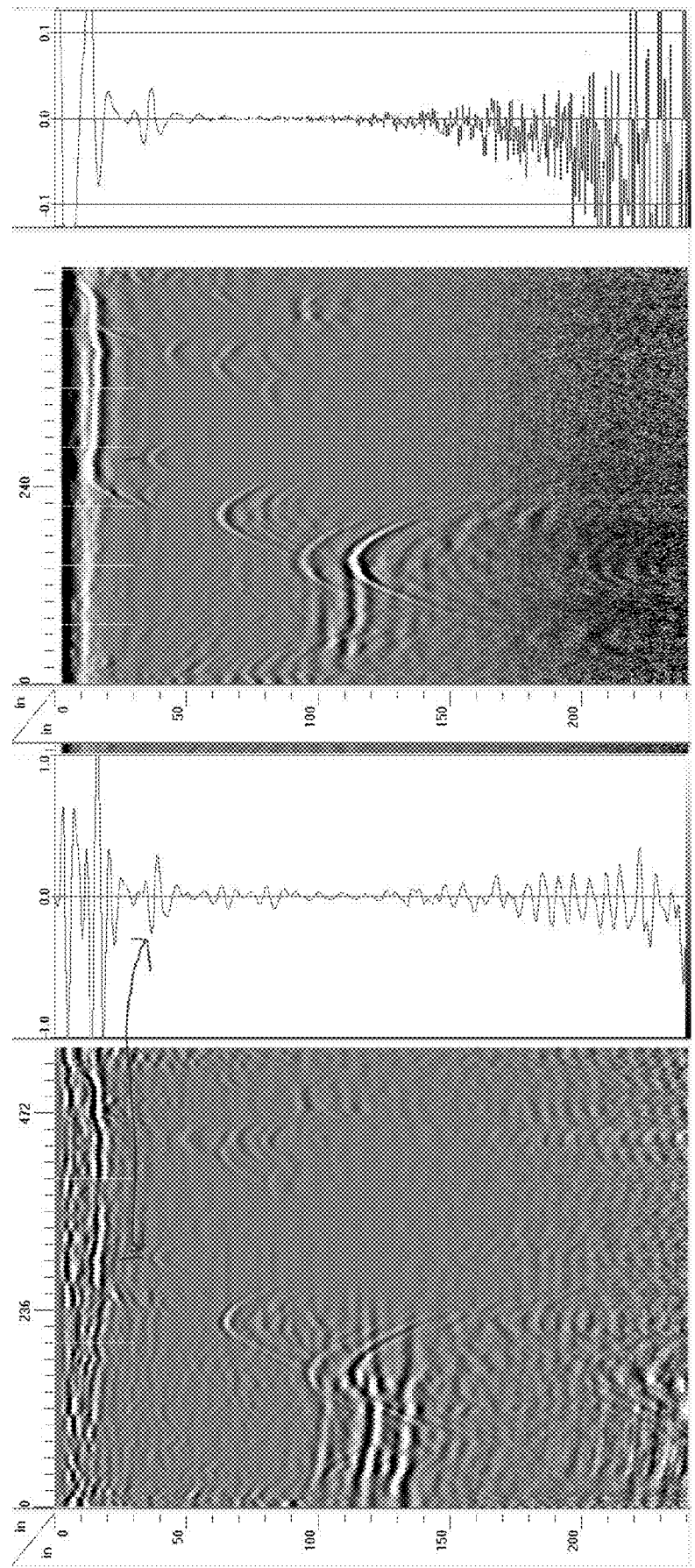
FIG. 9A shows measurement results using methods of the disclosed technology.
FIG. 9B shows measurement results using prior art methods.

FIG. 9A shows measurement results using methods of the disclosed technology. FIG. 9B shows measurement results using prior art methods. The data shown in FIG. 9A was acquired using a 14-bit 500 Ms/S (Mega Sample per Second) dual-core ADC and implemented using a 400 MHz GPR antenna construct. It was then compared to the incumbent ETS device, whose sampling rate is 200 KHz (one sample per transmitted pulse). Over a measurement time range of 128 nS, the high speed interpolated sampler collects 32 samples per transmitted pulse and each measurement waveform is then averaged 611 times. The amount of time to collect a complete measurement is 10 ms for both the high speed interpolated sampler and the conventional ETS antenna and the radiated transmitter power is equivalent. FIG. 9A shows the high speed interpolated sampler, while FIG. 9B depicts the ETS results. The top set of measurements was taken in a target-rich environment, while the bottom set was performed in more loose soil with fewer targets. It is observed that deeper targets are obscured by noise in the ETS case, while the high speed interpolated sampler results of FIG. 9A show little noise, even at longer time ranges.

Figure 10:
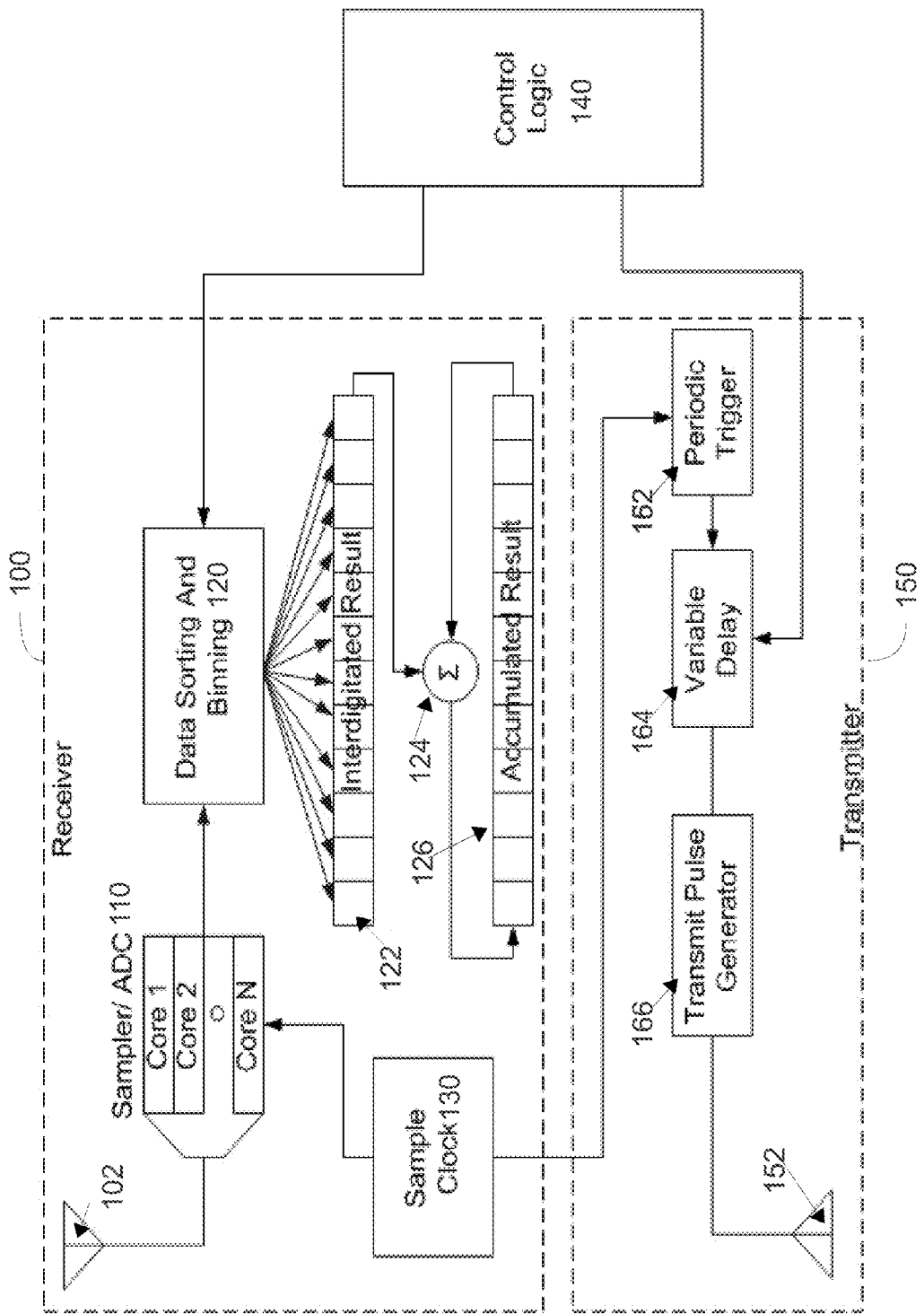
FIG. 10 shows a functional block diagram of a device used to produce an interpolation artifact canceling accumulation result, in embodiments of the disclosed technology.

FIG. 10 shows a block diagram of devices used to produce an accumulated result, in embodiments of the disclosed technology. The receiver 100 has a receiving antenna 102 with a plurality of cores of a sampling device/analog to digital converter (ADC) 110. As shown, there are cores 1, 2, through n number of cores (any reasonable finite whole number of cores). The data stream from the ADC sampler 110 is sent electrically to be sorted and binned by a processor, as shown in block 120. Control logic (such as FPGA) 140 controls the sorting and binning 120 as well as a variable delay 164. The sorting and binning of the processor is in accordance with a timing relationship to the transmit pulses, while the sampler/ADC timing remains constant. In this manner, no modification to an off-the-shelf ADC is necessary, which has a benefit of less cost to procure more precise equipment, even if such a task can be accomplished, as ADC cores known in the art, when using multiple parallel cores, each will have a unique error. The use of multiple ADC cores results in an artifact pattern.

Simultaneously adjusting the binning pattern 120 and transmitter delay of the transmitting antenna 152 of the transmitter 150 by way of providing a variable delay by way of a processor, shown in block 164 with control logic 140 determining the delay and the sorting/binning changes the phase of ADC cores of ADC 110 relative to the waveform. However, the waveform itself remains unchanged. Also shown in the figure are a periodic trigger 162, which triggers the variable delay 164 at regular clock cycles. A sample clock 130 measures the clock cycles and determines which ADC core of ADC 110 is used, such that the variable delay 164 changes the core order of the ADC 110 for each transmit pulse by varying the transmit pulse time. The transmit pulse time is varied, based on the variable delay 164 which determines when the pulse is generated by transmit pulse generator 166.

Figure 11:
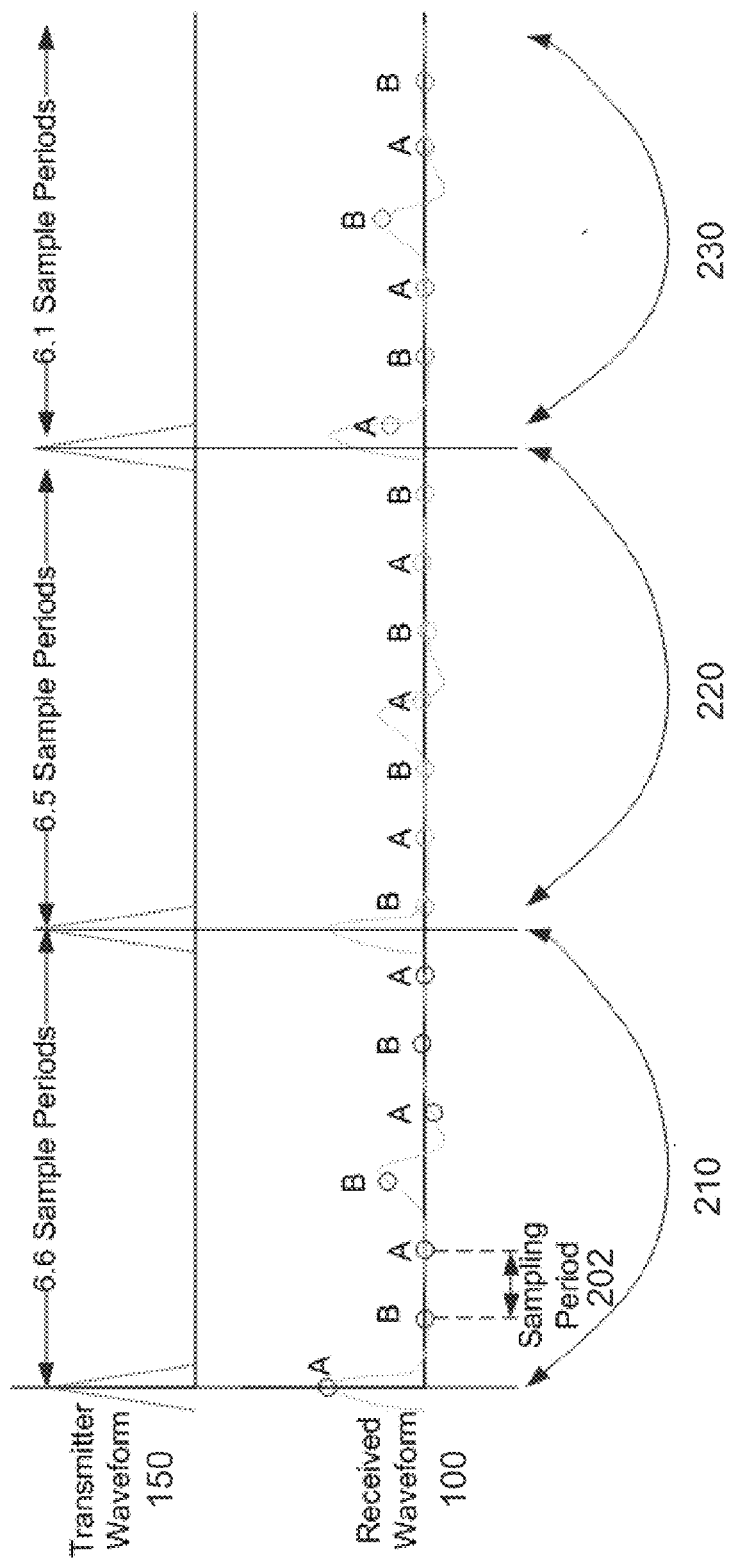
FIG. 11 shows a diagram of constituent waveform sampling in an embodiment of the disclosed technology.

FIG. 11 shows a diagram of constituent waveform sampling in an embodiment of the disclosed technology. The transmitter waveform 150 is shown on top, with regular transmitted pulses. The received waveform 100 is measured by two cores of an ADC, here, labeled A and B, a letter representative of a core. The sampler runs continuously at a sample period 202, here, alternating between cores. The received samples are sorted into the appropriate bins, as described with reference to FIG. 10, above. The transmitter is triggered many times with many different delays, such that the delay amount is shuffled in a random or pseudo-random order to avoid introducing errors inherent in a repeated shuffle order. That is, the shuffle has a random time-jitter (or pseudo-random time jitter) so that the shuffling is not periodic.

Each set of shuffled received signals is combined together. Those received in the receiving waveform 100 during period 210 form a first constituent waveform, those received during period 220 form a second constituent waveform, and those received during time period 230 form a third constituent waveform. This is repeated a multiple of times to provide a proper result. This is also shown in FIG. 10, where the interdigitated result 122 is summed 124 to produce an accumulated result 126.

Figure 12:
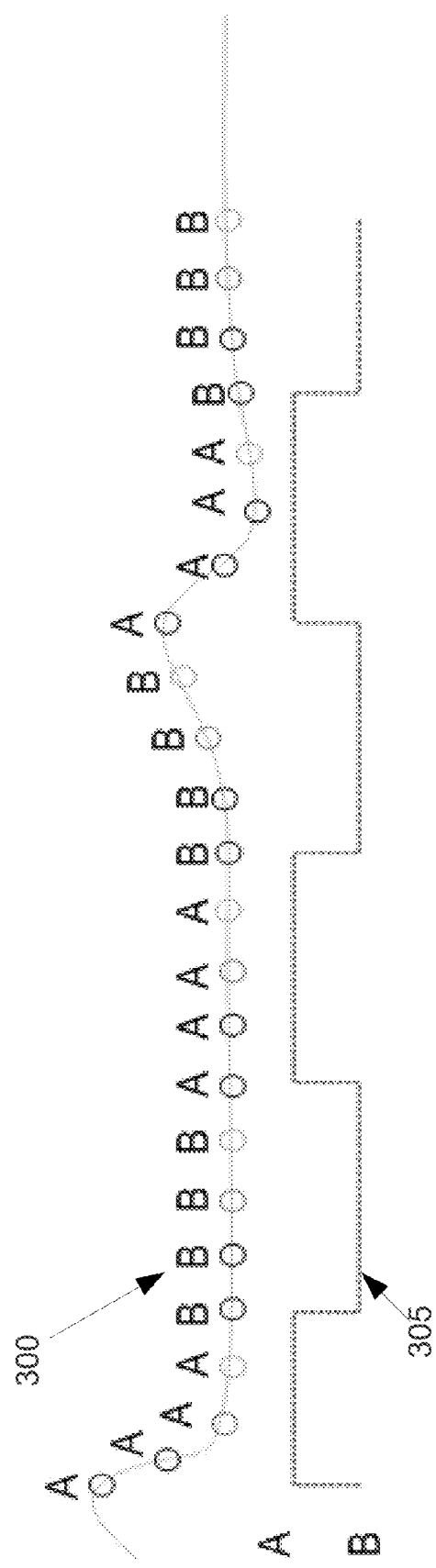
FIG. 12 shows a diagram of a composite interdigitated waveform and resultant ADC core interpolation artifact pattern in an embodiment of the disclosed technology.

FIG. 12 shows a diagram of a composite interdigitated waveform and sample error pattern in an embodiment of the disclosed technology. The composite interdigitated waveform 300 is shown, juxtaposed with the error pattern 305 due to the use of multiple ADC cores. As described above, the waveform is assembled by interdigitating the samples of the multitudes of constituent waveforms (different intensity circles denote different sampling phases). Since the sampler, itself, is comprised of multiple parallel cores (taking turns, such as in a round robin fashion), the sorted-then-binned data comprises an artifact pattern that is related to the interdigitation pattern. However, error from individual cores is canceled by the combination of waveforms, as each sample time is accumulated from samples taken with varying (pseudo-random or random) time delays.

Figure 13:
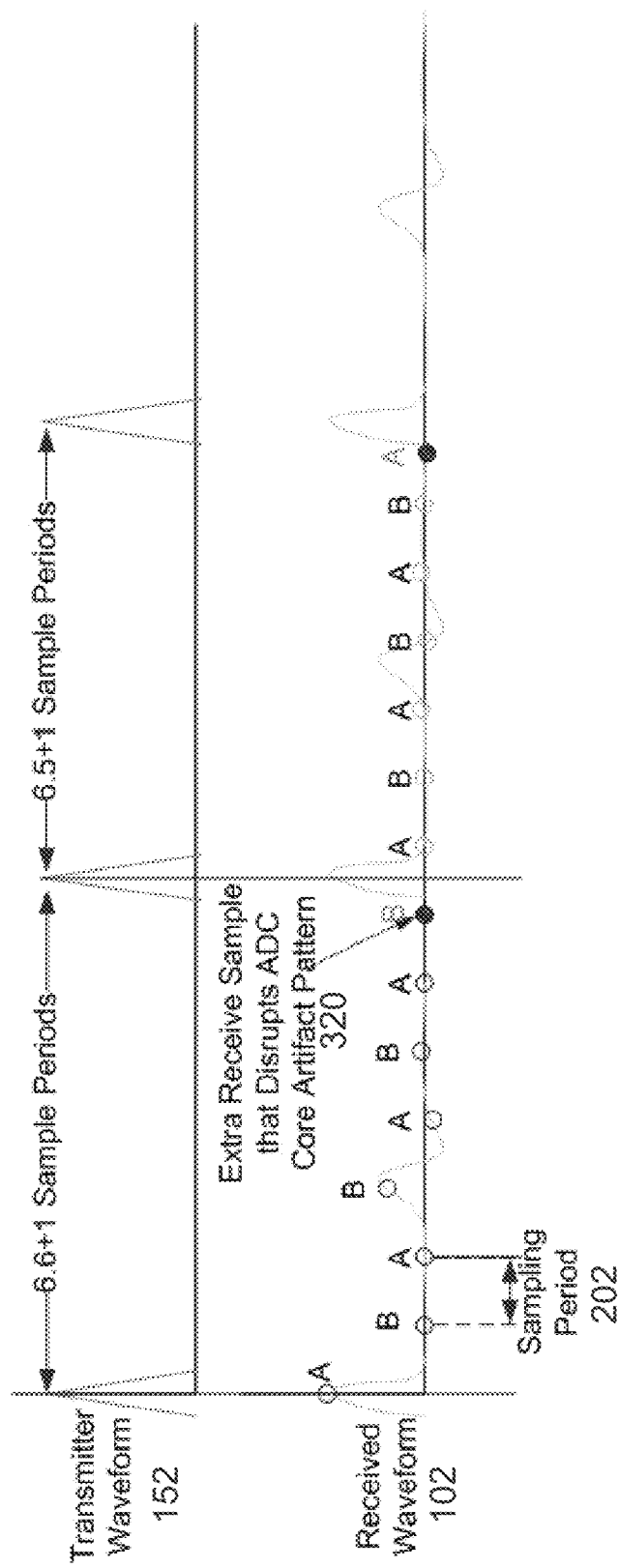
FIG. 13 shows shifting of an artifact pattern without shifting the sampled data, in an embodiment of the disclosed technology.

FIG. 13 shows shifting of an artifact pattern without shifting the sampled data, in an embodiment of the disclosed technology. An extra integer time delay in the transmit waveform is inserted. The extra received sample at point 320 disrupts the ADC core artifact pattern. Once this is done, then the extra sample must be accounted for when binning the incoming data tream. The resultant sampled data remains the same as before the extra sample was received (again, only the receiver time delay is modified, not the transmitter or ADC), yielding the same resultant sampled data, though the cores of the ADC are now switched.

Figure 14:
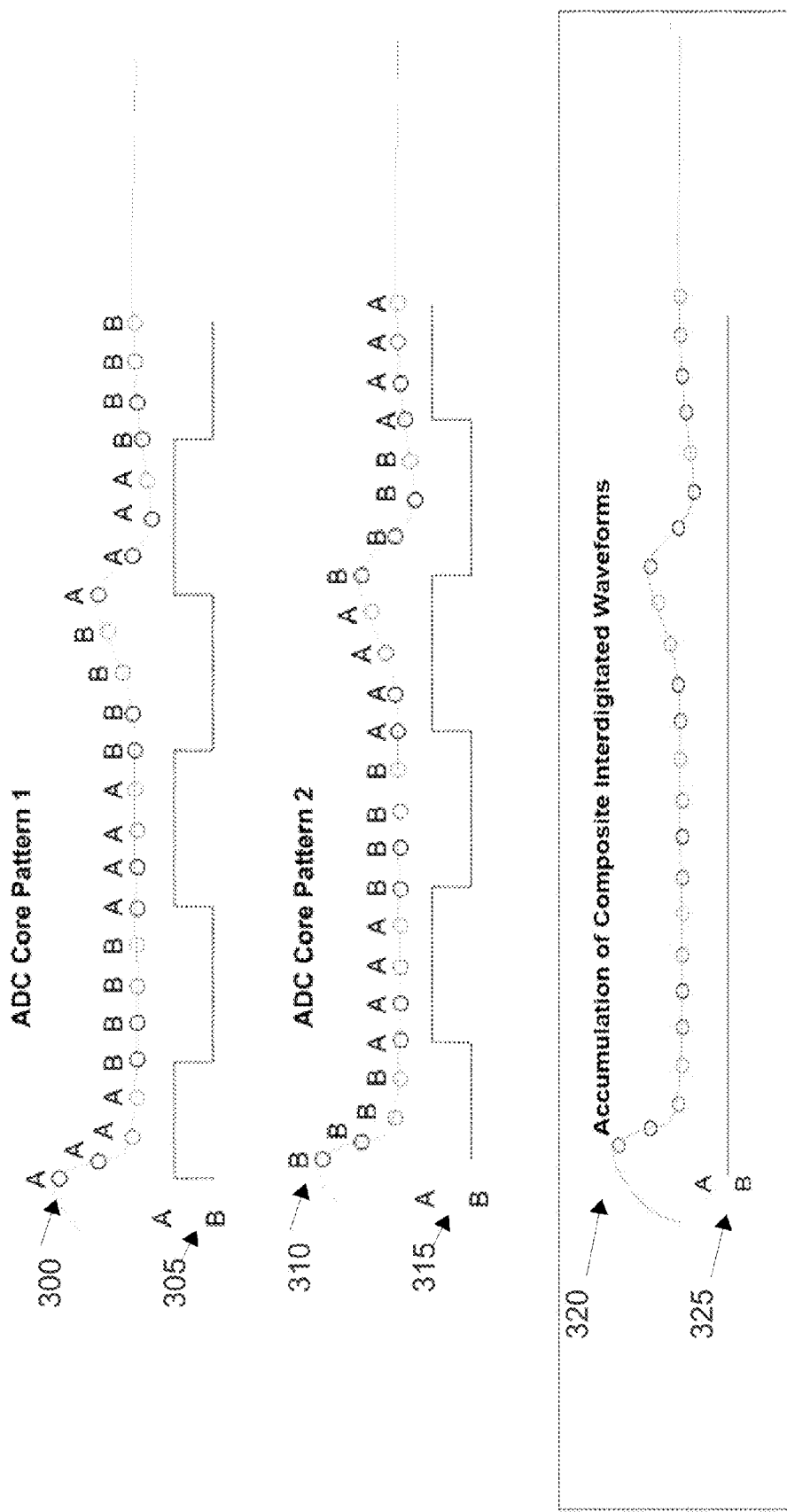
FIG. 14 shows the accumulation of two copies an interpolated waveform, each with a different ADC interpolation error pattern(in an embodiment of the disclosed technology.

FIG. 14 shows the accumulation of an interpolated waveform, in an embodiment of the disclosed technology. Since the ADC cores are shifted by way of inserting a sample (by way of varying the receiver time delay), at least two patterns can be obtained. Here, a first ADC core pattern 300 is shown with ADC variation 305, and a second ADC core pattern 310 is shown, with a shifted variation 315, the ADC variations due to errors inherent in each core of the ADC. The accumulated composite waveform 320 is interdigitated based on the core patterns 300 and 310, with the variations based on each ADC core canceled, as shown in the resultant variation 325. It should be understood that, for simplicity, two cores are shown with their combinations thereof, but any number of cores and a corresponding number of introduced samples are used in embodiments of the disclosed technology such that the error from each ADC core is canceled.

Figure 15:
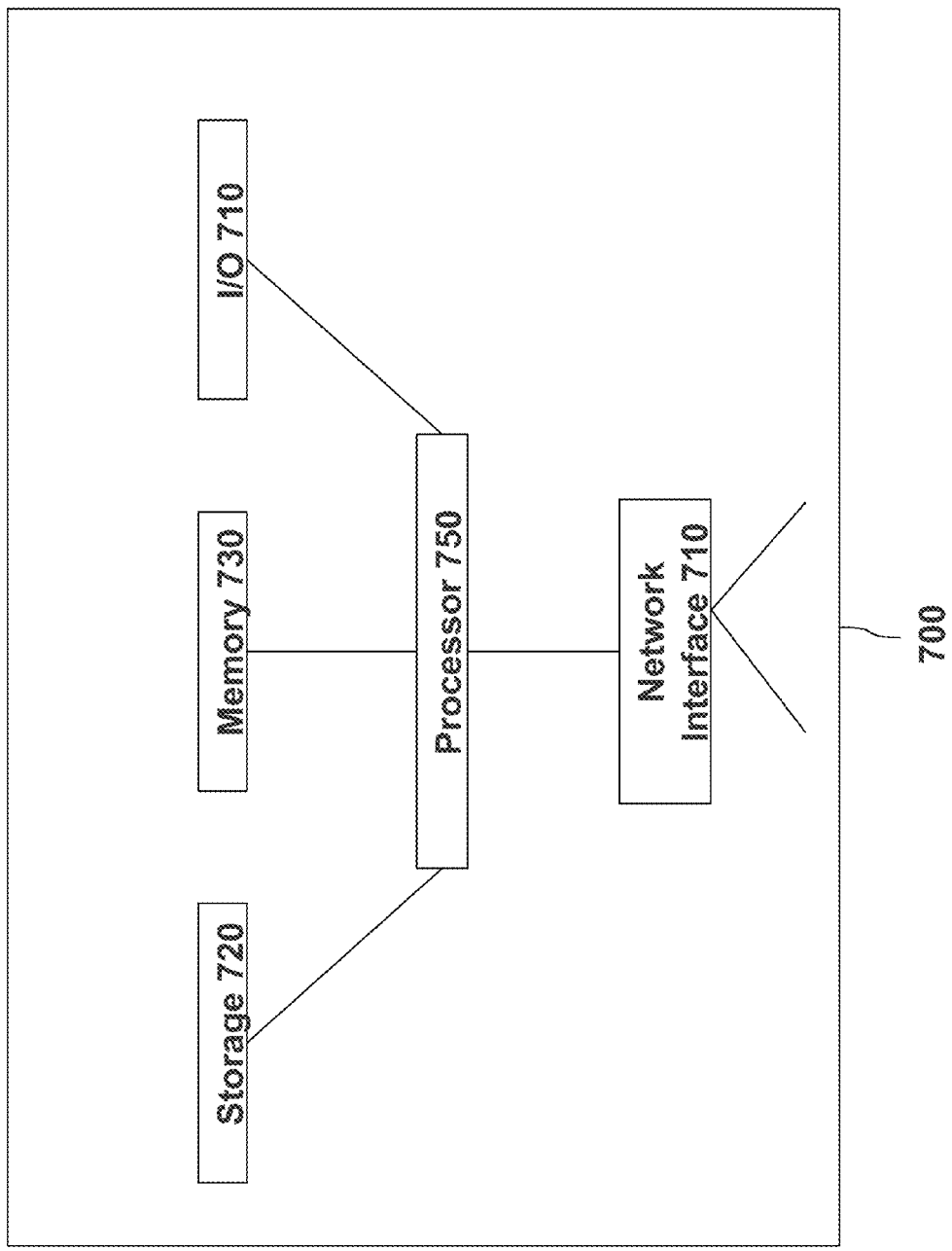
FIG. 15 shows a high-level block diagram of a measurement device that may be used to carry out the disclosed technology.

FIG. 15 shows a high-level block diagram of a measurement device that may be used to carry out the disclosed technology. Measurement device 700 comprises a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A measurement device 700 also includes one or a plurality of input network interfaces for communicating with other devices via a network (e.g., the internet). A measurement device 700 also includes one or more output network interfaces 710 for communicating with other devices. Measurement device 700 also includes input/output 740 representing devices which allow for user interaction with the computer 700 (e.g., display, keyboard, mouse, speakers, buttons, etc.). One skilled in the art will recognize that an implementation of an actual measurement device will contain other components as well, and that FIG. 10 is a high level representation of some of the components of such a measurement device for illustrative purposes. It should also be understood by one skilled in the art that the method and devices depicted in FIGS. 1 through 9 may be implemented on a device such as is shown in FIG. 10.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A ground-penetrating radar transmitter and receiver comprising:
   an analog to digital converter (ADC), trigger logic, and programmable delay generator;
   said trigger logic generating a series of randomly dithered trigger pulses;
   said analog to digital converter producing a continuous stream of digital samples from analog data;
   a processor constructing a measurement waveform comprised of a plurality of interdigitated linearly sampled sequences based on output of said trigger logic and said analog to digital converter;
   said processor further offsetting each said sequence of said plurality of sequences by a time frame whose modulus is smaller than the sampling period of a single sampled sequence of said plurality of sampled sequences; and wherein
   said measurement waveform is constructed from a plurality of iterations of constructing said interdigitated waveform from constituent sequences which form said interdigitated waveform;
   said constructing is based on accumulation or averaging of said interdigitated waveforms; and
   said accumulation or averaging incorporates interdigitated waveforms that were collected using equal representations of each core of said multi-core analog to digital converter (ADC), such that said ADC core's interleaving error is canceled.

2. The ground-penetrating radar transmitter and receiver of claim 1 wherein said measurement waveform further comprises a plurality of combined individual interdigitated sequences, wherein each said linearly sampled sequence is acquired at a lower rate than is represented by said measurement sequence.

3. The ground-penetrating radar transmitter and receiver of claim 2, further
   transmits a plurality of pulses into the ground at a location, each transmitted pulse of said plurality of pulses comprising a unique fractional delay corresponding to a position of phase of said interdigitated sequences.

4. The ground-penetrating radar transmitter and receiver of claim 3, wherein the sampling phase of each said sequence in said plurality of interdigitated linearly sampled sequences is collected in a randomized interdigitation order.

5. The ground-penetrating radar transmitter and receiver of claim 3, wherein the sampling phase of each said sequence in said plurality of interdigitated linearly sampled sequences is collected in a pseudo-randomized interdigitation order.

6. The ground-penetrating radar transmitter and receiver of claim 5, wherein each said sequence is sampled a single time in said plurality of combined individual interdigitated sequences.

7. The ground-penetrating radar transmitter and receiver of claim 3, wherein a discrete time filter is applied to said measurement waveform after construction of said measurement waveform.

8. The ground-penetrating radar transmitter and receiver of claim 3, wherein resultant transmit pulses of at least one single-sampled sequence are pseudo-randomly jittered with discretely quantized time steps equal to said unique fractional delay, such that said measured waveform is whitened.

9. The ground penetrating radar transmitter and receiver of claim 1, wherein an ADC core interleave phase of said ADC is adjusted by adding a fixed time delay equal to an integer multiple of the time sample period of each linearly sampled sequence of said plurality of linear sampled sequences, to every transmit pulse used to construct the composite of the interdigitated sequences.

10. The ground penetrating radar transmitter and receiver of claim 1, wherein said ADC core interleave phase is adjusted by utilizing system clocking whose fractional relationship results in composite measurement sequences that comprise alternating ADC core interleaving pattern error such that summation of an integer number of composite interdigitated sequences results in hardware ADC core interleave error cancellation.

11. A method of producing a waveform using a ground-penetrating radar transmitter and receiver, comprising the following steps:
    obtaining a plurality of interdigitated linearly sampled sequences by transmitting a plurality of pulses into the ground using said transmitter;
    using a processor or analog to digital converter to offset each said sequence of said plurality of linearly sampled sequences by a time frame smaller than the sampling period of a single-sampled sequence of said plurality of sampled sequences;
    constructing a measurement waveform based on said plurality of interdigitated linearly sampled sequences and displaying said measurement waveform on a display; wherein
    constructing from a plurality of iterations of constructing said interdigitated waveform from constituent sequences which form said interdigitated waveform;
    said constructing being based on accumulation or averaging of said interdigitated waveforms; and
    said accumulation or averaging incorporates interdigitated waveforms that were collected using equal representations of each core of a multi-core analog to digital converter (ADC), such that said ADC core's interleaving error is canceled.

12. The method of producing a waveform using a ground-penetrating radar transmitter and receiver of claim 11, further comprising a step of constructing a measurement sequence comprised of a plurality of combined individual interdigitated sequences;
    wherein each said linearly sampled sequence is acquired at a lower rate than is represented by said measurement sequence.

13. The method of producing a waveform using a ground-penetrating radar transmitter and receiver of claim 12, further comprising a step of transmitting a plurality of pulses into the ground at a single location;
    wherein each transmitted pulse of said plurality of pulses comprises a unique fractional delay corresponding to a position of phase of said interdigitated sequences.

14. The method of producing a waveform using a ground-penetrating radar transmitter and receiver of claim 13, wherein the sampling order of each said sequence in said plurality of interdigitated linearly sampled sequences is randomized or pseudo-randomized.

15. The method of producing a waveform using a ground-penetrating radar transmitter and receiver of claim 14, wherein each said sequence is sampled exactly one time in said plurality of combined individual interdigitated sequences.

16. The method of producing a waveform using a ground-penetrating radar transmitter and receiver of claim 13, wherein resultant transmit pulses of at least one single-sampled sequence are pseudo-randomly jittered with discretely quantized time steps equal to said unique fractional delay, such that said measured waveform is whitened.

* * * * *